United States Patent
Matsuno et al.

(10) Patent No.: US 9,294,686 B2
(45) Date of Patent: Mar. 22, 2016

(54) IMAGE CAPTURE APPARATUS AND IMAGE CAPTURE METHOD

(71) Applicant: NISSAN MOTOR CO., LTD., Yokohama-shi, Kanagawa (JP)

(72) Inventors: Yosuke Matsuno, Atsugi (JP); Hidekazu Nishiuchi, Yokohama (JP); Kouki Mitsuishi, Atsugi (JP); Jun Matsumoto, Hadano (JP)

(73) Assignee: NISSAN MOTOR CO., LTD., Yokohama-shi, Kanagawa (JP)

( * ) Notice: Subject to any disclaimer, the term of this patent is extended or adjusted under 35 U.S.C. 154(b) by 0 days.

(21) Appl. No.: 14/429,141

(22) PCT Filed: Sep. 10, 2013

(86) PCT No.: PCT/JP2013/074333
§ 371 (c)(1),
(2) Date: Mar. 18, 2015

(87) PCT Pub. No.: WO2014/050535
PCT Pub. Date: Apr. 3, 2014

(65) Prior Publication Data
US 2015/0229821 A1 Aug. 13, 2015

(30) Foreign Application Priority Data

Sep. 25, 2012 (JP) ................. 2012-210671

(51) Int. Cl.
*H04N 5/225* (2006.01)
*H04N 5/235* (2006.01)
(Continued)

(52) U.S. Cl.
CPC ............... *H04N 5/2355* (2013.01); *G03B 7/08* (2013.01); *G03B 15/05* (2013.01); *H04N 5/2354* (2013.01); *G03B 2215/05* (2013.01)

(58) Field of Classification Search
CPC ........... G06T 2207/30156; G06T 2207/30236; G06T 2207/30248–2207/30268; G06T 2210/21; B60R 2001/1253; B60R 11/04; B60R 21/01538; B60R 25/305; B60R 2300/00–2300/108; B60R 2300/207; B60R 2300/303–2300/305; G06K 9/00785–9/00845; G06K 2209/15; G06K 2209/23; A61B 5/18; G08G 1/0175; G08G 1/054; G08G 1/16–1/168
USPC .................................................. 348/148, 149
See application file for complete search history.

(56) References Cited

U.S. PATENT DOCUMENTS 6,464,633 B1 * 10/2002 Hosoda ................ A61B 1/0638
348/68

(Continued)

FOREIGN PATENT DOCUMENTS

CN    101536493 A    9/2009
EP    1887318 A2    2/2008
(Continued)

*Primary Examiner* — Twyler Haskins
*Assistant Examiner* — Dwight C Tejano
(74) *Attorney, Agent, or Firm* — Young Basile

(57) ABSTRACT

An image capture apparatus generates synchronous detection images under different exposure conditions in such a way that each synchronous detection image is obtained by subtracting the output values of an image captured with no light projected from the output values of an image captured with light projected, selects one or more pixels from the rest of the pixels at each position of the two or more synchronous detection images under the different exposure conditions excluding the pixel having the lowest output value, and generates a synchronous detection image by using the selected pixels.

8 Claims, 5 Drawing Sheets

(51) Int. Cl.
*G03B 15/05* (2006.01)
*G03B 7/08* (2014.01)

(56) References Cited

U.S. PATENT DOCUMENTS 7,697,062 B2  4/2010  Wernersson
7,920,247 B2 * 4/2011  Kitano ................. G01C 15/002
                                                356/3.1
2008/0044060 A1 * 2/2008  Satoh ................. G01B 11/2513
                                                382/103
2008/0106636 A1  5/2008  Wernersson
2009/0040500 A1 * 2/2009  Nishiushi ................. G01S 7/48
                                                356/3.11

FOREIGN PATENT DOCUMENTS

JP       58-087486 A    5/1983
WO     2006085834 A1   8/2006

* cited by examiner

IMAGE CAPTURE APPARATUS AND IMAGE CAPTURE METHOD

CROSS REFERENCE TO RELATED APPLICATION

The present application claims priority to Japanese Patent Application No. 2012-210671, filed Sep. 25, 2012, incorporated herein in its entirety.

TECHNICAL FIELD

The present invention relates to an image capture apparatus and an image capture method.

BACKGROUND

There has been known a snow depth sensor in which a projector projects a light ray in the form of a beam to a snow surface as a measurement target, and a photo detector in a photo receiver evaluates light reception of the light reflected from the snow surface to measure the depth of snow accumulation (see Japanese Patent Application Publication No. S58-87486). In the snow depth sensor in Japanese Patent Application Publication No. S58-87486, modulated light is projected and a photo detector element in the photo detector performs synchronous detection on the received light based on a modulation frequency. This processing extracts only a component of the projected light from the light reflected from the snow surface, and thereby reduces an influence of the ambient light.

In general, however, the photosensitivity characteristics of a photo detector element include a low sensitivity region on a high luminance side or a low luminance side. For this reason, if, for example, a sunny area and a shaded area are contained in a captured image, contrast in a synchronous detection image varies largely between these areas, and therefore it is not possible to obtain a synchronous detection image being stable in overall image contrast.

SUMMARY

The present invention has be made in view of the foregoing problem, and has an objective to provide an image capture apparatus and an image capture method capable of generating a synchronous detection image being stable in overall image contrast.

For the purpose of achieving the foregoing objective, an image capture apparatus according to an aspect of the present invention generates two or more synchronous detection images under different exposure conditions in such a way that each synchronous detection image is obtained by subtracting the output values of an image captured with no light projected from the output values of an image captured with light projected, selects one or more pixels from the rest of pixels at each position in the two or more synchronous detection images under the different exposure conditions excluding the pixel having the lowest output value, and generates a synchronous detection image by using the selected one or more pixels.

DESCRIPTION OF EMBODIMENTS

Image Capture Apparatus

Figure 1:
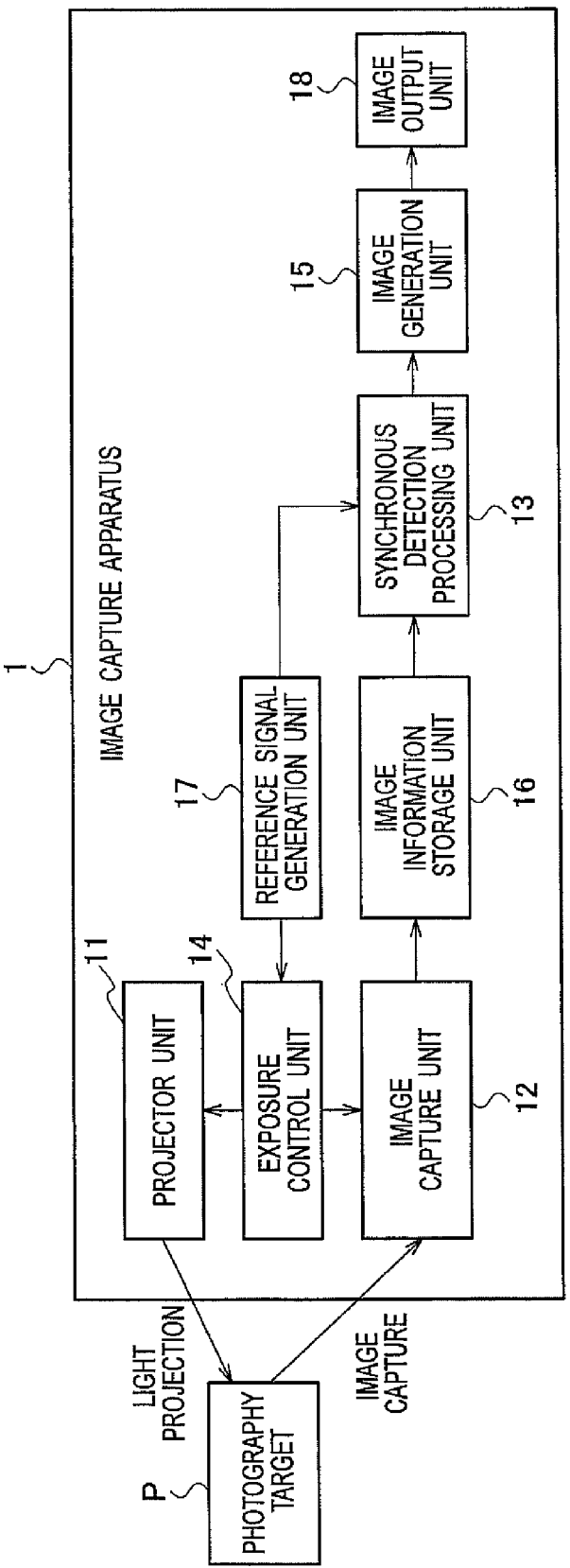
FIG. 1 is a block diagram illustrating a configuration of an image capture apparatus according to an embodiment of the present invention.

Hereinafter, description is provided for embodiments of the present invention with reference to the drawings. With reference to FIG. 1, description is provided for a configuration of an image capture apparatus 1 according to an embodiment of the present invention. The image capture apparatus 1 is provided on a mobile object such for example as a vehicle, and includes a projector unit 11, an image capture unit 12, a synchronous detection processing unit 13, an exposure control unit 14, an image generation unit 15, an image information storage unit 16, a reference signal generation unit 17, and an image output unit 18 as illustrated in FIG. 1.

The image capture unit 12 captures an image by using a semiconductor element (photo detector element) such as a CMOS sensor or a CCD sensor whose output values vary among pixels depending on light reception volumes. The image capture unit 12 captures an image of a photography target P such as a white line on a road, for example.

In synchronization with the image capture by the image capture unit 12, the projector unit 11 projects light onto an area, an image of which is to be captured by the image capture unit 12. More specifically, the projector unit 11 irradiates the photography target P with light in synchronization with image capture timing. The projector unit 11 projects light, which is intensity-modulated based on a reference signal generated by the reference signal generation unit 17, to the photography target P.

The reference signal generation unit 17 generates a reference signal in a sine wave form, for example, and generates a synchronous pulse signal such as a PWM signal from the reference signal. The generated synchronous pulse signal is forwarded to the projector unit 11 and the image capture unit 12 through the exposure control unit 14. The projector unit 11 projects light in synchronization with reception timing of the received synchronous pulse signal. The image capture unit 12 captures an image in synchronization with reception timing of the received synchronous pulse signal.

The exposure control unit 14 controls the image capture timing of the image capture unit 12, the projection timing of the projector unit 11, and exposure conditions of the image capture unit 12 and the projector unit 11. Specifically, the exposure control unit 14 controls at least one of an exposure time of the image capture unit 12 and a diaphragm value of a lens included in the image capture unit 12 as the exposure conditions of the image capture unit 12. The exposure control unit 14 controls at least one of a projection volume and a projection time of the projector unit 11 as the exposure conditions of the projector unit 11. The exposure control unit 14 controls the image capture timing of the image capture unit 12 and the projection timing of the projector unit 11 such that the image capture unit 12 can capture an image with light projected by the projector unit 11, and also the image capture unit 12 can capture an image with no light projected by the projector unit 11. The exposure control unit 14 controls the image capture unit 12 and the projector unit 11 in such a manner as to obtain two or more synchronous detection images under different exposure conditions.

The image information storage unit 16 temporarily stores electronic data of images captured by the image capture unit 12, reads the stored image data in one detection cycle, and transfers the read image data to the synchronous detection processing unit 13.

The synchronous detection processing unit 13 performs synchronous detection processing based on the image data in the one detection cycle and the reference signal outputted from the reference signal generation unit 17, and thereby generates two or more synchronous detection images under different exposure conditions within the one detection cycle. Specifically, the synchronous detection processing unit 13 obtains a synchronous detection image by subtracting output values of an image captured with no light projected by the projector unit 11 from output values of an image captured with light projected by the projector unit 11.

The image generation unit 15 selects one or more pixels from the rest of the pixels at each of positions in the two or more synchronous detection images under the different exposure conditions excluding the pixel having the lowest output value, and generates a single synchronous detection image by using the selected one or more pixels. In the case where one pixel is selected from the rest of the pixels excluding the pixel having the lowest output value, the synchronous detection image can be generated by arranging the selected pixels in accordance with their respective pixel positions. For example, the image generation unit 15 can generate the synchronous detection image by selecting the pixel having the highest output value among the pixels located at each of the positions in the two or more synchronous detection images under the different exposure conditions, and arranging the selected pixels in accordance with their respective pixel positions.

Here, a pixel selected by the image generation unit 15 is not only any of a pixel of the photo detector element included in the image capture unit 12 and a pixel of the image captured by the image capture unit 12, but also includes a pixel block formed by grouping multiple neighboring pixels. More specifically, the image generation unit 15 may select one or more pixels from the rest of the pixels at each position in two or more synchronous detection images under different exposure conditions excluding the pixel having the lowest output value, and generate a synchronous detection image by using the selected one or more pixels. Alternatively, the image generation unit 15 may select one or more pixel blocks from the rest of pixel blocks at each position in two or more synchronous detection images under different exposure conditions excluding the pixel block having the lowest output value, and generate a synchronous detection image by using the selected one or more pixel blocks. The output value of a pixel block may be an average value of the output values of the pixels constituting the pixel block.

The image output unit 18 outputs the synchronous detection image generated by the image generation unit 15 to a lower level system.

<Exposure Control>

Figure 2:
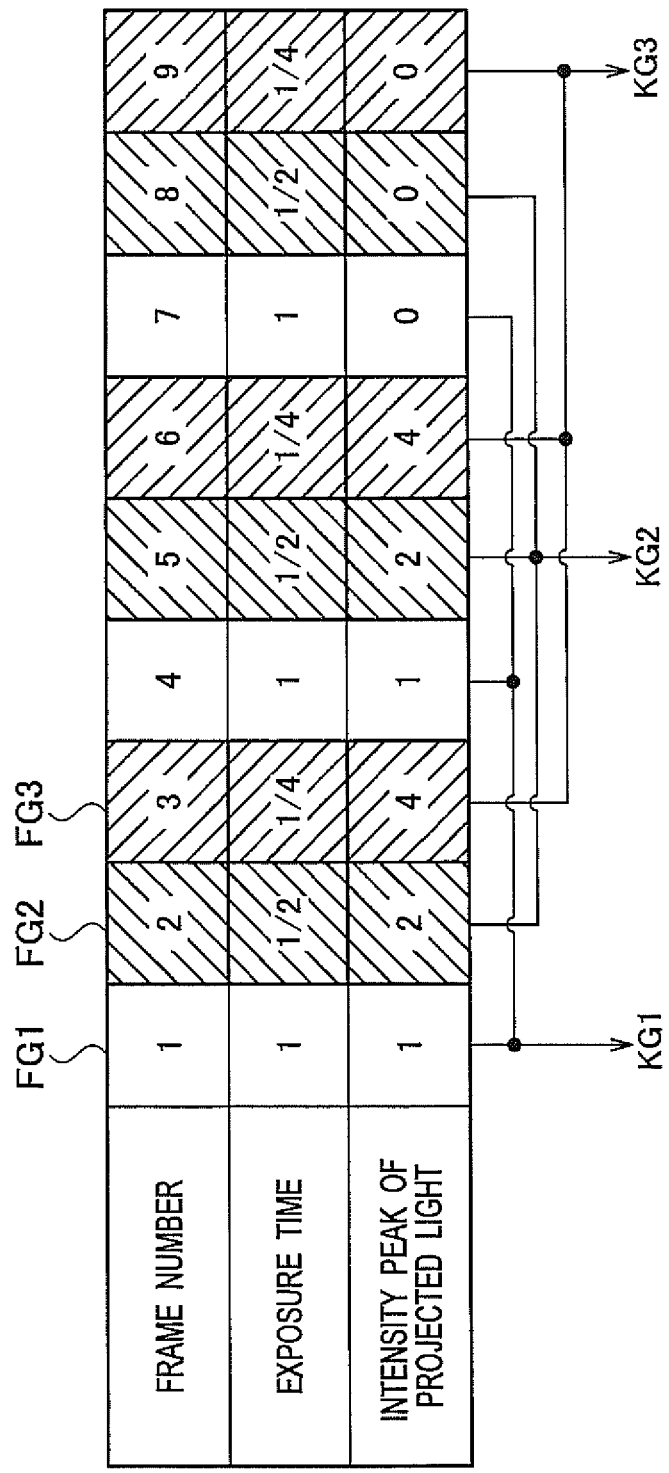
FIG. 2 is a table presenting one example of exposure conditions in each of frames for obtaining two or more synchronous detection images under different exposure conditions in one detection cycle.

Next, with reference to FIG. 2, description is provided for how the exposure control unit 14 controls the image capture unit 12 and the projector unit 11 such that two or more synchronous detection images under different exposure conditions can be obtained within one detection cycle. In FIG. 2, a "frame number" presents identification numbers indicating respective frames captured within one detection cycle. Here, the "frame" includes one or more images captured at consecutive image capture time points. An "exposure time" indicates a normalized value of an exposure time in each frame, or specifically a time during which the photo detector element receives light through the lens in each frame. More specifically, provided that the exposure time in a frame 1 is 1, the exposure time in a frame 2 is ½ and the exposure time in a frame 3 is ¼. An "intensity peak of projected light" indicates a normalized projection volume of light projected by the projector unit 11 in synchronization with an image capture in each frame. More specifically, provided that the projection volume in the frame 1 is 1, the projection volume in the frame 2 is 2 and the projection volume in the frame 3 is 4.

When the image capture unit 12 receives the light projected by the projector unit 11 (in a projection volume of 1) only for the exposure time (1) in the frame 1, an exposure volume of the image capture unit 12 is 1×1=1. When the image capture unit 12 receives the light projected by the projector unit 11 (in a projection volume of ½) only for the exposure time (2) in the frame 2, the exposure volume of the image capture unit 12 is ½×2=1. When the image capture unit 12 receives the light projected by the projector unit 11 (in a projection volume of ¼) only for the exposure time (4) in the frame 3, the exposure volume of the image capture unit 12 is ¼×4=1. In this way, the exposure control unit 14 controls the exposure conditions of the image capture unit 12 and the projector unit 11 such that the exposure volume of the image capture unit 12 to the light projected by the projector unit 11 can be constant among the frames 1 to 3. In frames 4 to 6, the exposure control unit 14 controls the exposure conditions of the image capture unit 12 and the projector unit 11 in the same manner. The exposure control unit 14 may control, as the exposure conditions of the image capture unit 12, the diaphragm value of the lens instead of the exposure time of the image capture unit 12. In this case, the exposure control unit 14 may reduce the diaphragm value instead of increasing the exposure time. In addition, the exposure control unit 14 may control, as the exposure conditions of the projector unit 11, the projection time of the projector unit 11 instead of the projection volume of the projector unit 11. In this case, the exposure control unit 14 may increase the projection time of the projector unit 11 instead of increasing the projection volume thereof.

The exposure times and the projection volumes in the frames 4 to 6 are equal to those in the frames 1 to 3, respectively. The exposure times in frames 7 to 9 are also equal to those in the frames 1 to 3, respectively. However, all the projection volumes in the frames 7 to 9 are zero. In other words, the frames 7 to 9 correspond to images captured by the image capture unit 12 with no light projected by the projector unit 11.

The synchronous detection processing unit 13 obtains synchronous detection images KG1 to KG3 by subtracting the output values in the frames 7 to 9 captured with no light projected by the projector unit 11 from the output values in the frames 1 to 6 captured with light projected by the projector unit 11. For example, the output values in the frame 7 having an exposure time equal to that of the frames 1 and 4 are subtracted from a frame having average values of the output values of the frames 1 and 4 captured in the light projected state. This calculation extracts a component of projected light from the light reflected from the photography target P, and results in generation of a synchronous detection image in which the influence of ambient light is reduced. Similarly, the output values in the frame 8 having an exposure time equal to that of the frames 2 and 5 are subtracted from a frame having average values of the output values of the frames 2 and 5. Then, the output values in the frame 9 having an exposure time equal to that of the frames 3 and 6 are subtracted from a frame having average values of the output values of the frames 3 and 6. In this way, the exposure control unit 14 controls the exposure time of the image capture unit 12 and the projection volume of the projector unit 11 in such a manner as to obtain the three synchronous detection images KG1 to KG3 under the different exposure conditions.

<Gain Characteristics of Synchronous Detection>

Figure 3:
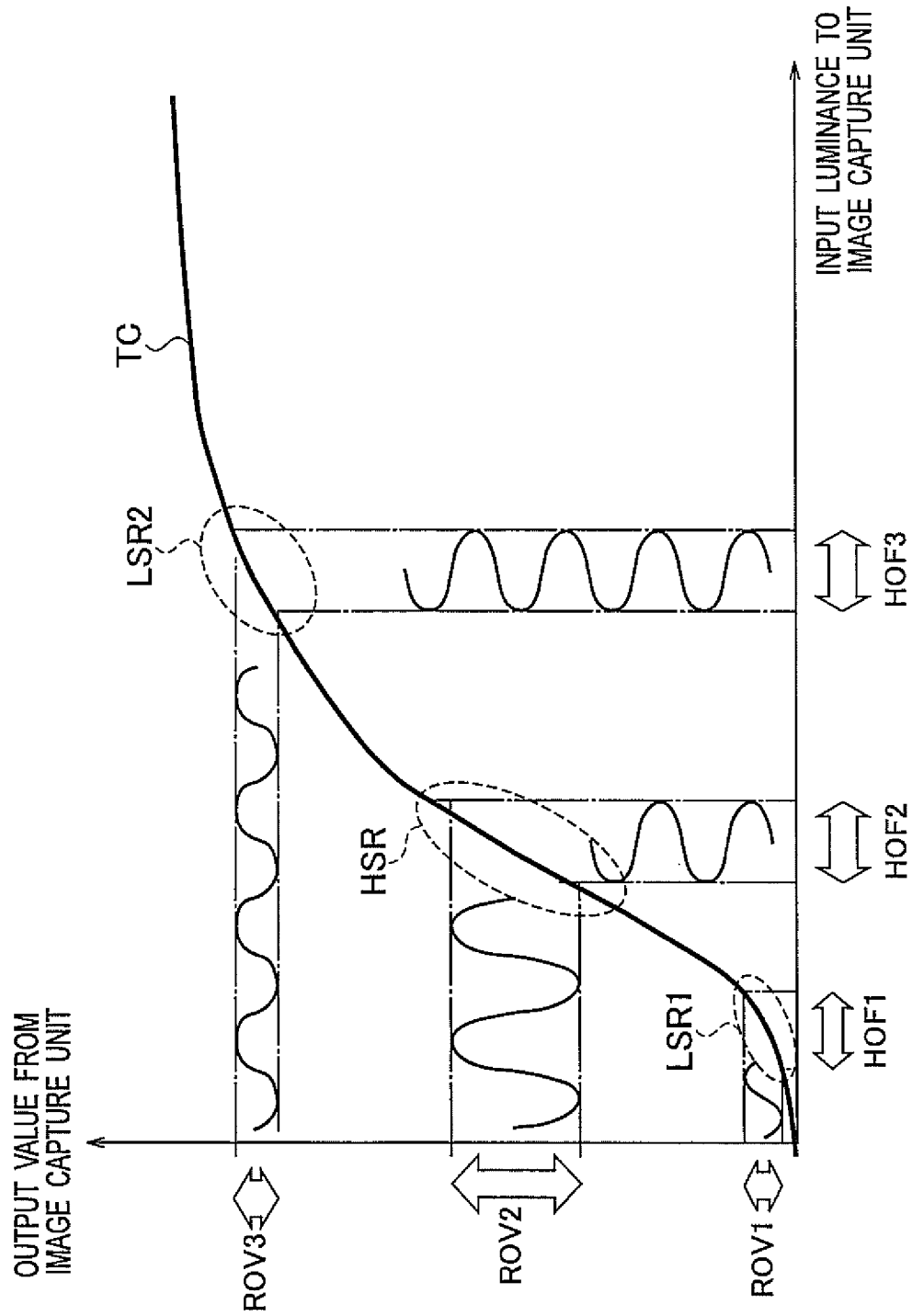
FIG. 3 is a graph presenting a relationship between luminance (light reception volume) of light incident on a photo detector element in an image capture unit 12 and an output value of the image capture unit 12.

With reference to FIG. 3, description is provided for a relationship between luminance (light reception volume) of light incident on the photo detector element of the image capture unit 12 and an output value of the image capture unit 12. The horizontal axis of FIG. 3 indicates the luminance (light reception volume) of light incident on the photo detector element of the image capture unit 12, and the vertical axis of FIG. 3 indicates the output value of the image capture unit 12. As indicated by a line TC, the output value of the image capture unit 12 monotonously increases with an increase in the light reception volume. However, an increase rate (synchronous detection gain) of the output value with respect to the light reception volume changes depending on the light reception volume of the photo detector element. Specifically, the synchronous detection gains on a high luminance side with a large light reception volume and on a low luminance side with a small light reception volume are lower than the synchronous detection gain in an intermediate region. For this reason, the line TC indicating the output characteristics of the image capture unit 12 includes a high sensitivity region HSR and a low sensitivity region LSR1 and region LSR2.

The synchronous detection images KG1 to KG3 are images formed from differences between the output values of the frames 1 to 6 captured with light projected by the projector unit 11 and the output values of the frames 7 to 9 captured with no light projected by the projector unit 11. In other words, the synchronous detection images KG1 to KG3 are images in each of which only the component of the light projected by the projector unit 11 is extracted from the light received by the image capture unit 12. In general, however, the component of ambient light such as solar light in the light received by the image capture unit 12 excluding the component of the light projected by the projector unit 11 is larger than the component of the light projected by the projector unit 11. For this reason, according to the foregoing output characteristics of the image capture unit 12, the contrast in each of the synchronous detection images KG1 to KG3 may vary in some cases depending on the light volume of the ambient light.

To be more specific, in a synchronous detection image having a small light volume of ambient light, the component of the light projected by the projector unit 11 in the light received by the image capture unit 12 falls under a region HOF1 in FIG. 3. On the other hand, in a synchronous detection image having a large light volume of ambient light, the component of the light projected by the projector unit 11 in the light received by the image capture unit 12 falls under a region HOF3 in FIG. 3. The regions HOF1 and HOF3 correspond to the low sensitivity regions LSR1, LSR2, respectively. For this reason, a ratio of an output value ROV1 or ROV3 of the image capture unit 12 relative to the light volume of the light projected by the projector unit 11 (region HOF1 or region HOF3), or namely the synchronous detection gain is small.

In contrast, in the case where the component of the light projected by the projector unit 11 in the light received by the image capture unit 12 falls under a region HOF2 in FIG. 3, the synchronous detection image can use the high sensitivity region HSR of the image capture unit 12. For this reason, a ratio of an output value ROV2 of the image capture unit 12 relative to the light volume of the light projected by the projector unit 11 (region HOF2), or namely the synchronous detection gain is large.

Accordingly, if a single synchronous detection image contains multiple areas having different light volumes of ambient light, such as a sunny area and a shaded area, for example, these areas are subjected to the different sensitivity regions HSR, LSR1, LSR2 of the image capture unit 12. This results in a large variation in contact within a single image.

<Synchronous Detection Processing and Image Synthesis Processing>

Figure 4:
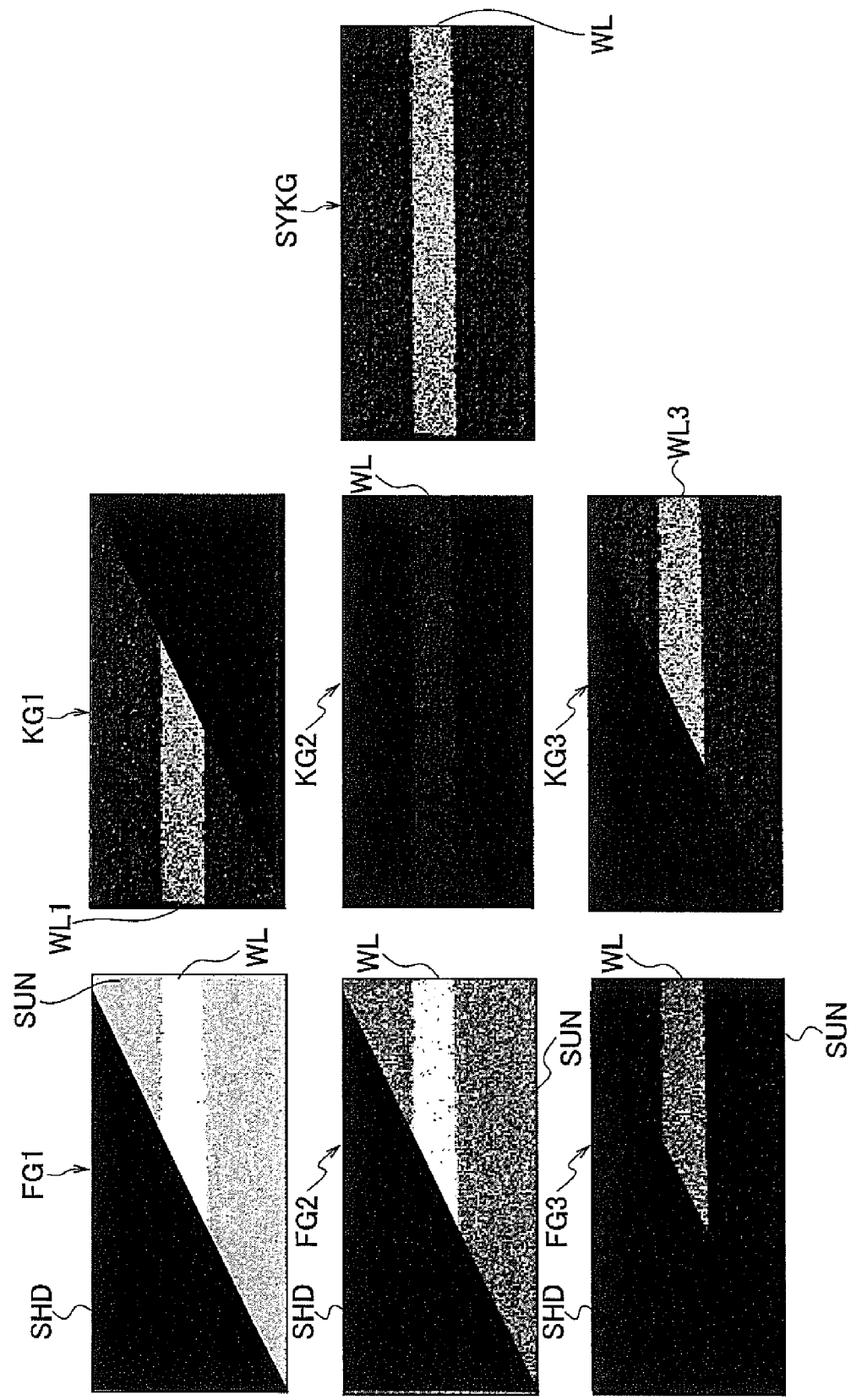
FIG. 4 presents a view illustrating one example of luminance images FG1 to FG3 corresponding to frames 1 to 3 presented in FIG. 2, synchronous detection images KG1 to KG3 in FIG. 2, and a synchronous detection image SYKG.

With reference to FIG. 4, description is provided for specific examples of synchronous detection processing by the synchronous detection processing unit 13 and image synthesis processing by the image generation unit 15. FIG. 4 illustrates one example of luminance images FG1 to FG3 corresponding to the frames 1 to 3 illustrated in FIG. 2, the synchronous detection images KG1 to KG3 in FIG. 2 and a synchronous detection image SYKG obtained by synthesizing the synchronous detection images KG1 to KG3.

All the images illustrated in FIG. 4 are images captured of a white line WL (photography target P) extending horizontally at a center of the picture. An upper left portion of the picture is a shaded SHN area, and a lower right portion of the picture is a sunny SUN area. The luminance images FG1 to FG3 are equal to each other in terms of the component of the light projected by the projector unit 11 in the light received by the image capture unit 12, but the luminance images FG1 to FG3 are different from each other in terms of the exposure time. As a result, due to an influence of the ambient light, the overall image luminance becomes high to low in the order of FG1, FG2, and FG3.

In the synchronous detection image KG1, the sunny SUN area is an area having a large light volume of ambient light, and accordingly the component of the light projected by the projector unit 11 in the light received by the image capture unit 12 falls under the region HOF3 in FIG. 3. Thus, the sunny SUN area in the synchronous detection image KG1 turns into an image captured with the low sensitivity region LSR2 in FIG. 3. On the other hand, in the synchronous detection image KG1, the shaded SHN area is an area not having a large light volume of ambient light, and accordingly the component of the light projected by the projector unit 11 in the light received by the image capture unit 12 falls under the region HOF2 in FIG. 3. Thus, the shaded SHN area in the synchronous detection image KG1 turns into an image captured with the high sensitivity region HSR in FIG. 3.

Meanwhile, the synchronous detection image KG3 has a lower overall image luminance than the synchronous detection image KG1. Thus, the sunny SUN area in the synchronous detection image KG3 is an area not having a large light volume of ambient light, and therefore the component of the light projected by the projector unit 11 in the light received by the image capture unit 12 falls under the region HOF2 in FIG. 3. Accordingly, the sunny SUN area in the synchronous detection image KG3 turns into an image captured with the high sensitivity region HSR in FIG. 3. On the other hand, in the synchronous detection image KG1, the shaded SHN area is an area having a small light volume of ambient light, and therefore the component of the light projected by the projector unit 11 in the light received by the image capture unit 12 falls under the region HOF1 in FIG. 3. Accordingly, the shaded SHN area in the synchronous detection image KG1 turns into an image captured with the low sensitivity region LSR1 in FIG. 3.

It is noted that the overall image luminance of the synchronous detection image KG2 is between those of the synchronous detection image KG1 and the synchronous detection image KG3. Hence, the sunny SUN area turns into an image captured with a region between the high sensitivity region HSR and the low sensitivity region LSR2 in FIG. 3. Then, the shaded SHN area turns into an image captured with a region between the high sensitivity region HSR and the low sensitivity region LSR1 in FIG. 3. As a result, the contrast in the synchronous detection image KG2 in FIG. 4 is lower than the contrast on the shaded SHN side in the synchronous detection image KG1 and the contrast on the sunny SUN side in the synchronous detection image KG3. However, the synchronous detection image KG2 does not have a large difference in contrast between the sunny SUN area and the shaded SHN area.

Next, description is provided for the image synthesis processing by the image generation unit 15. The image generation unit 15 compares the output values among the pixels at each position in the three synchronous detection images KG1 to KG3 under the different exposure conditions, and selects the pixel having the highest output value. Specifically, for the shaded SHN area, the synchronous detection image KG1 has the highest output values among the three synchronous detection images KG1 to KG3. Thus, the pixels in the synchronous detection image KG1 are selected for the shaded SHN area. For the sunny SUN area, the synchronous detection image KG3 has the highest output values among the three synchronous detection images KG1 to KG3. Thus, the pixels in the synchronous detection image KG3 are selected for the sunny SUN area. In this way, for each of the positions of the pixels constituting a synchronous detection image, the pixel having the highest output value is selected. Then, the sunny SUN pixels of the synchronous detection image KG3, and the shaded SHN pixels of the synchronous detection image KG1 are arranged in accordance with their respective pixel positions to generate a single synchronous detection image SYKG. In this way, the image generation unit 15 is capable of generating a synchronous detection image by selecting the pixel having the highest output value among the pixels at each position in the three synchronous detection images KG1 to KG3 under the different exposure conditions, and by synthesizing the selected pixels.

<Image Capture Method>

Figure 5:
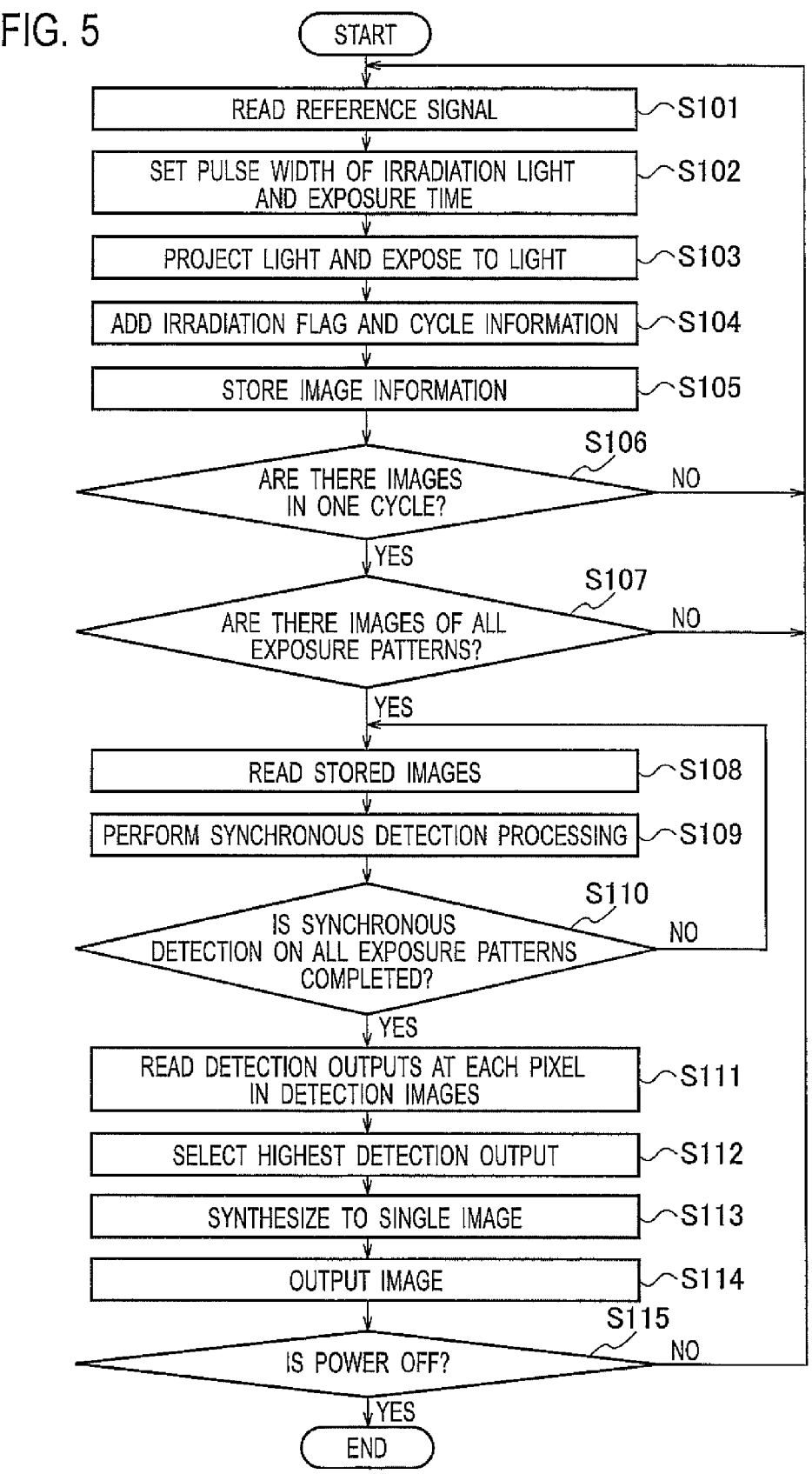
FIG. 5 is a flowchart illustrating an image capture method using the image capture apparatus 1 in FIG. 1 according to the embodiment of the present invention.

Next, with reference to FIG. 5, description is provided for an image capture method using the image capture apparatus 1 in FIG. 1 according to the embodiment of the present invention.

Firstly, in step S101, the exposure control unit 14 reads the reference signal outputted from the reference signal generation unit 17. Then, going to step S102, the exposure control unit 14 sets the projection volume of the light to be projected by the projector unit 11 and the exposure time of the image capture unit 12.

Going to step S103, the projector unit 11 projects light in synchronization with the reception timing of the received synchronous pulse signal, and the image capture unit 12 captures an image in synchronization with the reception timing of the received synchronous pulse signal. The projector unit 11 irradiates the photography target P with light which is intensity-modulated as a PWM signal.

Going to step S104, the image capture apparatus 1 adds an irradiation flag and cycle information to the capture image, the irradiation flag indicating that the captured image is obtained with light irradiation. In other words, the image capture apparatus 1 adds information indicating in which position the image concerned is from the top among images captured within one detection cycle. Going to step S105, the image information storage unit 16 stores the captured image.

Going to step S106, the image capture apparatus 1 determines whether all the frames 1 to 9 in one detection cycle are already captured. If not all the frames 1 to 9 in one detection cycle are captured (NO in S106), the processing returns to step S101, and the next frame is captured. On the other hand, if all the frames 1 to 9 are already captured (YES in S106), the processing goes to step S107.

In step S107, the image capture apparatus 1 determines whether all the three kinds of frames under the different exposure conditions illustrated in FIG. 2 are already captured. If not all the three kinds of frames under the different exposure conditions are captured (NO in S107), the processing returns to step S101, and the next frame is captured. On the other hand, if all the three kinds of frames under the different exposure conditions are already captured (YES in S107), the processing goes to step S108.

In step S108, the synchronous detection processing unit 13 reads the luminance images (frames 1 to 9) in one detection cycle stored in the image information storage unit 16. Going to step S109, the synchronous detection processing unit 13 performs the synchronous detection processing based on the luminance images in the one detection cycle, and thereby generates three kinds of synchronous detection images under the different exposure conditions.

Going to step S110, it is determined whether all the synchronous detection images KG1 to KG3 under the different exposure conditions are already generated. If not all the synchronous detection images KG1 to KG3 under the different exposure conditions are generated (NO in S110), the processing returns to step S108 and the next synchronous detection image is generated. If all the synchronous detection images KG1 to KG3 under the different exposure conditions are generated (YES in S110), the processing goes to step S111.

In step S111, the image generation unit 15 reads the output values of the pixels at each position in all the synchronous detection images KG1 to KG3 under the different exposure conditions. Going to step S112, the image generation unit 15 selects the pixel having the highest output value among the pixels at each position in the synchronous detection images KG1 to KG3. Going to step S113, the image generation unit 15 generates a single synchronous detection image SYKG by arranging the selected pixels in accordance with their respective pixel positions. Going to step S114, the image output unit 18 outputs the generated synchronous detection image SYKG to the lower-level system. In step S115, if it is determined that a power supply is turned off, the processing is terminated.

As has been described above, the following effects can be obtained according to the embodiment of the present invention.

The exposure control unit 14 controls the image capture unit 12 and the projector unit 11 in such a manner as to obtain two or more synchronous detection images KG1 to KG3 under different exposure conditions. The image generation unit 15 selects one or more pixels from the rest of the pixels at each position in the two or more synchronous detection images KG1 to KG3 under the different exposure conditions excluding the pixel having the lowest output value, and generates the synchronous detection image SYKG by using the selected one or more pixels. In this way, one synchronous detection image SYKG can be generated by selecting, for each pixel, a region of a synchronous detection image having a high output value from among the two or more synchronous detection images KG1 to KG3 under the different exposure conditions. Hence, the synchronous detection image SYKG being stable in overall image contrast can be generated by using the two or more synchronous detection images KG1 to KG3 under the different exposure conditions.

The image generation unit 15 selects one pixel from the rest of the pixels at each position in the two or more synchronous detection images KG1 to KG3 under the different exposure conditions excluding the pixel having the lowest output value, and generates the synchronous detection image SYKG by arranging the selected pixels in accordance with their respective pixel positions. In this method, as compared with the case where two or more pixels are selected, the amount of calculation to be performed by the image generation unit 15 is reduced and accordingly the image processing speed becomes high.

The image generation unit 15 selects the pixel having the highest output value among the pixels at each position in the two or more synchronous detection images KG1 to KG3 under the different exposure conditions, and generates a synchronous detection image SYKG by arranging the selected pixels in accordance with their respective pixel positions. This method makes it possible to generate a synchronous detection image SYKG with stable and high contrast.

The exposure control unit 14 controls at least one of the exposure time and the diaphragm value of the image capture unit 12 to thereby change the exposure condition. Thus, two or more synchronous detection images KG1 to KG3 under the different exposure conditions can be obtained.

The exposure control unit 14 controls at least one of the projection volume and the projection time of the projector unit 11 to thereby change the exposure condition. Thus, the two or more synchronous detection images KG1 to KG3 under the different exposure conditions can be obtained.

The exposure control unit 14 controls the image capture unit 12 and the projector unit 11 such that the exposure volume of the image capture unit 12 to the light projected by the projector unit 11 can be constant. This makes it possible to generate synchronous detection images KG1 to KG3 being stable in overall image contrast.

Other Embodiments

In the foregoing embodiment, the image generation unit 15 selects one pixel from the rest of the pixels at each position in the two or more synchronous detection images KG1 to KG3 under the different exposure conditions excluding the pixel having the lowest output value. However, the present invention is not limited to this. The image generation unit 15 may select two or more pixels from the rest of the pixels excluding the pixel having the lowest output value. In this case, the image generation unit 15 can generate a synchronous detection image by arranging pixels each synthesized from the selected two or more pixels in accordance with their respective pixel positions. Here, the "pixel synthesized from the selected two or more pixels" may be a pixel in which the output values of the selected two or more pixels are averaged. Instead, the output values of the selected two or more pixels may be weighted according to their respective levels of the output values of the selected two or more pixels.

The image generation unit 15 selects the pixel having the highest output value among the pixels at each position in the two or more synchronous detection images KG1 to KG3 under the different exposure conditions. However, the present invention is not limited to this. The image generation unit 15 may select the pixel having the second highest output value, the pixel having the third highest output value, . . . among the pixels at each position in the two or more synchronous detection images KG1 to KG3 under the different exposure conditions.

The exposure control unit 14 generates three synchronous detection images KG1 to KG3 under the different exposure conditions as illustrated in FIG. 2. However, the number of synchronous detection images under different exposure conditions is not limited to three, but may be two, four or more.

Hereinabove, the details of the present invention have been described according to the embodiments. However, it is obvious to those skilled in the art that the present invention should not be limited to those described above, but may be altered and modified in various ways.

An image capture apparatus and an image capture method according to embodiments of the present invention are capable of generating one synchronous detection image by selecting, for each pixel, a region of a synchronous detection image having a high output value from among two or more synchronous detection images under different exposure conditions. Thus, a synchronous detection image being stable in overall image contrast can be obtained. An image capture apparatus and an image capture method according to embodiments of the present invention have industrial applicability.

The invention claimed is:

1. An image capture apparatus comprising:
an image capture unit configured to capture an image by using a photo detector element which provides an output value varied depending on a light reception volume;
a projector unit configured to project light to an area targeted for image capture by the image capture unit, in synchronization with the image capture by the image capture unit;
a synchronous detection processor configured to obtain a synchronous detection image by subtracting an output value of an image captured with no light projected by the projector unit, from an output value of an image captured with light projected by the projector unit;
an exposure controller configured to control the image capture unit and the projector unit in such a manner as to obtain two or more synchronous detection images under different exposure conditions; and
an image generator configured to select one or more pixels from the rest of pixels at each position in the two or more synchronous detection images under the different exposure conditions excluding a pixel having a lowest output value, and generate a synchronous detection image by using the selected one or more pixels.

2. The image capture apparatus according to claim 1, wherein
the image generator selects one pixel from the rest of the pixels at each position in the two or more synchronous detection images under the different exposure conditions excluding the pixel having the lowest output value, and generates the synchronous detection image by arranging the selected pixels in their respective pixel positions.

3. The image capture apparatus according to claim 2, wherein
the image generator selects the pixel having the highest output value from the pixels at each position in the two or more synchronous detection images under the different exposure conditions, and generates the synchronous detection image by arranging the selected pixels in accordance with their respective pixel positions.

4. The image capture apparatus according to claim 1, wherein the image generator selects two or more pixels from the rest of the pixels at each position in the two or more synchronous detection images under the different exposure conditions excluding the pixel having the lowest output value, and generates the synchronous detection image by arranging pixels, each synthesized from the selected two or more pixels, in accordance with their respective pixel positions.

5. The image capture apparatus according to claim 1, wherein the exposure controller changes the exposure conditions by controlling at least one of an exposure time and a diaphragm value of the image capture unit.

6. The image capture apparatus according to claim 1, wherein the exposure controller changes the exposure conditions by controlling at least one of a projection volume and a projection time of the projector unit.

7. The image capture apparatus according to claim 1, wherein the exposure controller controls the image capture unit and the projector unit such that an exposure volume of the image capture unit to light projected by the projector unit is constant.

8. An image capture method comprising:
capturing an image by using a photo detector element which provides an output value varied depending on a light reception volume;
projecting light to an area targeted for the image capture in synchronization with the capture of the image;
obtaining a synchronous detection image by subtracting an output value of an image captured with no light projected, from an output value of an image captured with light projected;
controlling the image capture and light projection in such a manner as to obtain two or more synchronous detection images under different exposure conditions in the image capture;
selecting one or more pixels from the rest of pixels at each position in the two or more synchronous detection images excluding a pixel having a lowest output value, and generating
a synchronous detection image by using the selected one or more pixels.

* * * * *